INVENTORS
TEIICHI SAKAMOTO
JUN NISHIDAI

BY Sughrue, Rothwell, Mion, Zinn & Macpeak

ATTORNEYS

May 5, 1970

TEIICHI SAKAMOTO ET AL 3,510,748

SIMPLIFIED POLARITY REVERSAL SYSTEM FOR
D.C. HIGH VOLTAGE GENERATOR

Filed July 5, 1968

INVENTORS
TEIICHI SAKAMOTO
JUN NISHIDAI

BY Sughrue, Rothwell, Mion, Zinn & Macpeak

ATTORNEYS

United States Patent Office 3,510,748
Patented May 5, 1970

3,510,748
SIMPLIFIED POLARITY REVERSAL SYSTEM FOR D.C. HIGH VOLTAGE GENERATOR
Teiichi Sakamoto and Jun Nishidai, Kyoto, Japan, assignors to Nissin Electric Co., Ltd., Kyoto, Japan
Filed July 5, 1968, Ser. No. 742,608
Claims priority, application Japan, July 8, 1967, 42/59,289
Int. Cl. H02m 7/04, 7/70
U.S. Cl. 321—8         2 Claims

ABSTRACT OF THE DISCLOSURE

A D.C. high voltage generator, for instance, a Cockcroft type generator, in which the rectifier elements are mounted on a rotatable column with a number of moveable contacts on the column and their mating contacts on the stationary component of the device, rotation of the column allowing polarity reversal of the high voltage generator.

BACKGROUND OF THE INVENTION

Field of the invention

This invention relates to a D.C. high voltage generator, and more particularly to a generator in which reversal of the output polarity is simpler than with conventional devices.

Description of the prior art

Heretofore, when the output polarity of a D.C. high voltage generator (such as a Cockcroft generator, which comprises a group of transformer windings, rectifiers, and capacitors) was to be changed, the connection of all of the rectifiers were changed individually. However, it was a painstaking job to change the output polarity when the number of the rectifiers was large, and it was utterly impossible to change the polarity when all of the elements of the device were immersed in an insulating oil or sealed in an insulating gas. Thus, the difficulty of polarity reversal constitutes a principal disadvantage of this prior art type of generator.

SUMMARY OF THE INVENTION

Therefore, the primary object of this invention is to overcome the above described disadvantage of the conventional devices.

Another object of this invention is to provide a novel construction of a D.C. high voltage generator or similar device in which the reversal of the connections to the rectifier elements is much simplified.

Still another object of this invention is to provide a novel construction of a D.C. high voltage generator or similar device in which the reversal of the connections to the rectifier elements is much simplified even where all of the elements of the device are immersed in an insulating oil or sealed in an insulating gas.

These and other objects of the invention which will be made apparent in the following description are accomplished by a novel construction according to the present invention, comprising a rotatable column of any suitable configuration on which the rectifier elements of the high voltage generator and the associated contacts are mounted in a fixed relative position whereby polarity reversal of the high voltage generator can be easily performed by rotating the column.

BRIEF DESCRIPTION OF THE DRAWINGS

The novel construction of the high voltage generator according to the present invention will be made apparent by the following description of the preferred embodiment thereof when read in conjunction with the attached drawings, in which.

Figure 1:
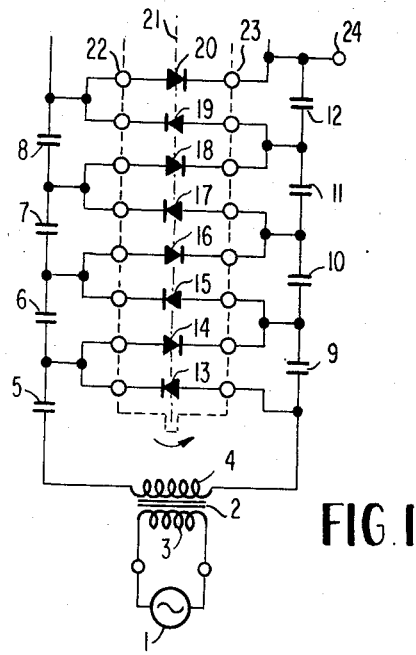
FIG. 1 is a schematic view of an embodiment wherein the principle of this invention is applied to the Cockroft D.C. high voltage generator.
Figure 2A:
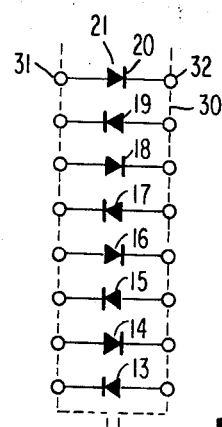
FIGS. 2a and 2b are two views of one example of the rotating column which constitutes one part of the present invention.
Figure 2B:
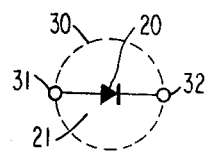

Referring first to FIG. 1, there is illustrated an A.C. power source 1, a transformer 2 having primary winding 3 and secondary winding 4 and capacitors 5–12. These elements are connected together into a plurality of stages through rectifier elements 13–20 so that the Cockcroft type D.C. high voltage generator is constructed. Element 21 is a freely rotatable column according to the present invention, described in more detail in FIG. 2.

The rectifier column 21 is made of an insulating member 30 on which the rectifier elements 13–20 are mounted so that they are connected between contacts such as 31 and 32, which are in contact with contacts 22 and 23 as shown in FIG. 1. By this arrangement, an ordinary D.C. output of the Cockcroft generator is obtained from the output terminal 24 in FIG. 1.

When it is desired to reverse the polarity of the output voltage, the column 21 is rotated by 180° and the stationary contacts, for instance the contacts 22 and 23, are brought to contact with the contacts 32 and 31 respectively.

Figure 3:
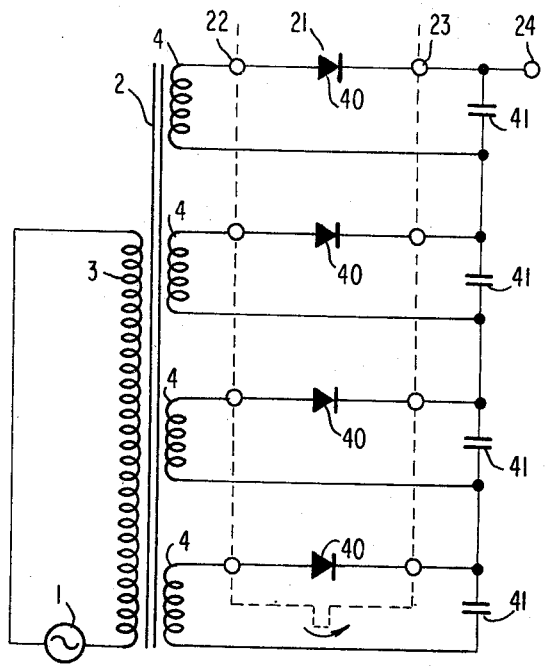
FIGS. 3, 4 and 5 are schematic views of other embodiments of the present invention.
Figure 4:
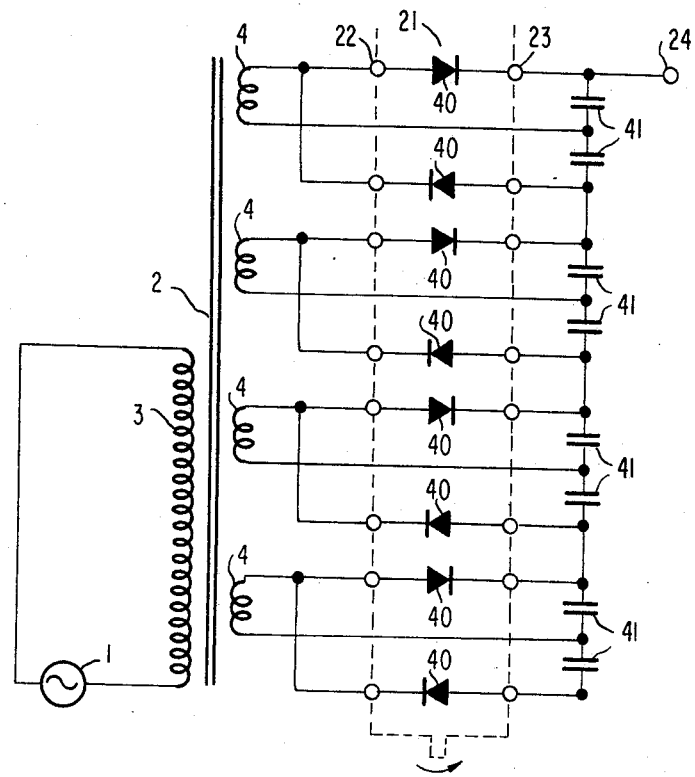
Figure 5:
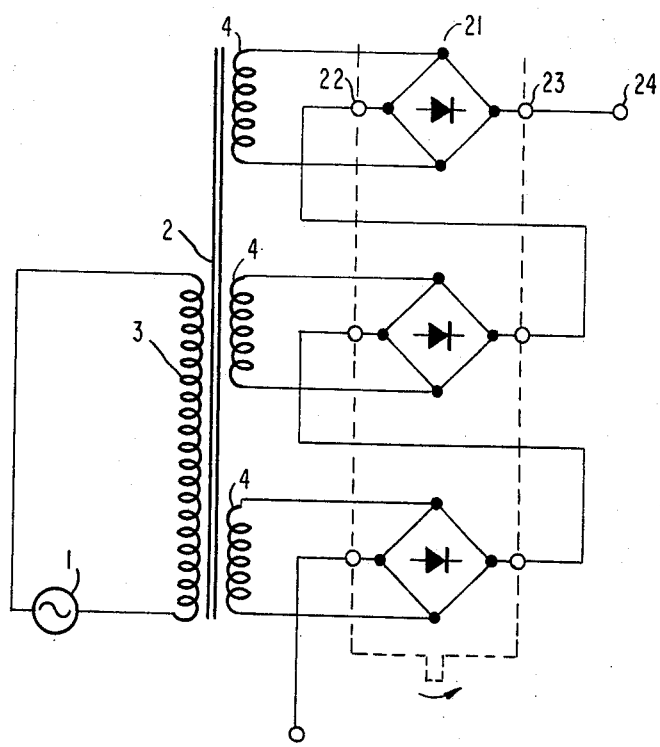

FIG. 3 is a half-wave rectifier circuit comprising a transformer 2, a rectifier element 40 and a condenser 41. FIG. 4 is a full-wave voltage-doubler rectifier circuit. FIG. 5 is an embodiment in which the invention is applied to a D.C. high voltage generator in a full-wave rectifier circuit. Elements 3 and 4 are the primary and secondary windings of the transformer 2 and terminal 24 is the D.C. output terminal. In this case also, the polarity change of the output voltage is carried out by the rotation of the column 21.

As described above, according to the present invention the polarity of the output voltage can be easily converted by the rotation of the column, whereby the complicated reconnection of individual elements can be eliminated. If the device is of the type sealed in a casing, the column 21 is also placed inside of the casing and provision may be made so that the column can be rotated from the outside of the casing. In this way, the polarity of the output voltage can be changed while maintaining the device in the sealed condition.

While the invention has been particularly shown and described with reference to preferred embodiments thereof, it will be understood by those skilled in the art that the foregoing and other changes in form and details may be made therein without departing from the spirit and scope of the invention.

We claim:
1. A polarity reversal system for a high voltage generator system of the type which receives an A.C. input, applies the A.C. input to a plurality of rectifier elements and generates a high voltage D.C. output comprising:
   (a) a rotatable column for rotation to one of a plurality of angular positions,
   (b) means for mounting said rectifier elements on said column for causing said elements to rotate with said column,
   (c) fixed contact means for making different electrical contact with said rectifier elements according to the angular position of said column, and
   (d) output means connected to said fixed contact means for producing said D.C. output having a polarity controlled by said angular position.

2. A polarity reversal system according to claim 1 further comprising:
   (a) a plurality of pairs of moveable electrical contacts mounted on said column for rotation therewith,
   (b) said fixed contact means comprising a corresponding plurality of pairs of fixed electrical contacts,
   (c) a corresponding plurality of pairs of said rectifier elements, each said element being electrically connected between the two contacts of a corresponding one of said pairs of moveable contacts, and
   (d) said pairs of moveable contacts and said pairs of fixed contacts being so arranged that corresponding pairs of contacts have their connections reversed by rotation of said column.

References Cited

UNITED STATES PATENTS 3,048,766  8/1962  Panzer _____ 321—15

FOREIGN PATENTS 257,872  4/1949  Switzerland.
887,659  6/1959  Great Britain.

LEE T. HIX, Primary Examiner

W. H. BEHA, JR., Assistant Examiner

U.S. Cl. X.R.

321—15